(12) United States Patent
Kim et al.

(10) Patent No.: US 11,087,965 B2
(45) Date of Patent: Aug. 10, 2021

(54) SAMPLE PLATE FOR MALDI MASS SPECTROMETRY AND MANUFACTURING METHOD THEREFOR

(71) Applicant: Bioneer Corporation, Daejeon (KR)

(72) Inventors: Taeman Kim, Daejeon (KR); Jong Rok Ahn, Daejeon (KR); Dohoon Kim, Daejeon (KR); Han-Oh Park, Daejeon (KR)

(73) Assignee: Bioneer Corporation, Daejeon (KR)

( * ) Notice: Subject to any disclaimer, the term of this patent is extended or adjusted under 35 U.S.C. 154(b) by 195 days.

(21) Appl. No.: 16/483,908

(22) PCT Filed: Feb. 14, 2018

(86) PCT No.: PCT/KR2018/001981
§ 371 (c)(1),
(2) Date: Aug. 6, 2019

(87) PCT Pub. No.: WO2018/151556
PCT Pub. Date: Aug. 23, 2018

(65) Prior Publication Data
US 2019/0393022 A1 Dec. 26, 2019

(30) Foreign Application Priority Data

Feb. 17, 2017 (KR) .................. 10-2017-0021565
Feb. 13, 2018 (KR) .................. 10-2018-0018048

(51) Int. Cl.
*H01J 49/04* (2006.01)
*G01N 27/62* (2021.01)
*H01J 49/34* (2006.01)

(52) U.S. Cl.
CPC .......... *H01J 49/0418* (2013.01); *G01N 27/62* (2013.01); *H01J 49/34* (2013.01)

(58) Field of Classification Search
CPC .......... H01L 21/6831; H01L 21/67109; H01L 21/68757; C04B 37/025; C04B 37/026; H01J 49/0418
See application file for complete search history.

(56) References Cited

U.S. PATENT DOCUMENTS

| | | |
|---|---|---|
| 6,454,924 B2 | 9/2002 | Jedrzejewski et al. |
| 7,297,501 B2 | 11/2007 | Diamond et al. |

(Continued)

FOREIGN PATENT DOCUMENTS

| | | |
|---|---|---|
| DE | 10054906 A1 | 5/2002 |
| JP | 2003524193 A | 8/2003 |

(Continued)

*Primary Examiner* — David E Smith
*Assistant Examiner* — Hsien C Tsai
(74) *Attorney, Agent, or Firm* — The Webb Law Firm

(57) ABSTRACT

A sample plate for MALDI mass spectrometry, according to the present invention, enables separately positioning, by means of a plastic insulation plate, metal wiring and metal dots onto which an analyte sample is to be loaded, and electrically connecting same by means of a via or a metal portion, and thus the energy transferred into the plate when radiating a laser beam on the target (metal dots) may be reduced compared to a sample plate using a base metal, and thus laser energy may be concentrated on the target, and an effect may be achieved whereby heat loss is minimized.

23 Claims, 14 Drawing Sheets

(56) References Cited

U.S. PATENT DOCUMENTS

| | | | |
|---|---|---|---|
| 7,928,367 B2 | 4/2011 | Hirota et al. | |
| 8,294,090 B1 * | 10/2012 | Honda | G01N 33/6848 250/288 |
| 8,999,266 B2 | 4/2015 | Yao et al. | |
| 9,589,826 B2 | 3/2017 | Ono | |
| 2003/0194709 A1 | 10/2003 | Yang | |
| 2008/0073511 A1 | 3/2008 | Svatos et al. | |
| 2013/0292561 A1 * | 11/2013 | Kim | G01N 1/00 250/282 |

FOREIGN PATENT DOCUMENTS

| | | |
|---|---|---|
| JP | 2004184137 A | 7/2004 |
| JP | 2006189391 A | 7/2006 |
| JP | 2007514173 A | 5/2007 |
| JP | 2007147656 A | 6/2007 |
| JP | 2008304369 A | 12/2008 |
| JP | 4649416 B2 | 3/2011 |
| JP | 201421048 A | 2/2014 |
| JP | 2015179617 A | 10/2015 |
| JP | 2016121968 A | 7/2016 |
| KR | 1020100051318 A | 5/2010 |
| KR | 101204342 B1 | 11/2012 |
| KR | 1020150106429 A | 9/2015 |
| KR | 1020160048257 A | 5/2016 |
| KR | 101649605 B1 * | 8/2016 |

* cited by examiner

SAMPLE PLATE FOR MALDI MASS SPECTROMETRY AND MANUFACTURING METHOD THEREFOR

CROSS-REFERENCE TO RELATED APPLICATIONS

This application is the United States national phase of International Application No. PCT/KR2018/001981 filed Feb. 14, 2018, and claims priority to Korean Patent Application Nos. 10-2017-0021565 and 10-2018-0018048, filed Feb. 17, 2017 and Feb. 13, 2018, respectively, the disclosures of which are hereby incorporated by reference in their entirety.

TECHNICAL FIELD

The present invention relates to a sample plate for matrix assisted laser desorption ionization (MALDI) mass spectrometry, a manufacturing method therefor, and a MALDI mass spectrometry method using the same.

BACKGROUND ART

Since the first use of mass spectrometry in the early 1900s, various ionization methods have been developed, and generally, electron impact (EI) is widely used as a standard ionization method. However, such a method may be used only for volatile samples and has the disadvantage that it may not be used for samples that are unstable to heat, and an application thereof has been mainly limited to organic low molecules.

For this reason, for mass spectrometric analysis of materials that are not volatile or not thermally stable, various ionization methods such as chemical ionization (CI), electro-spray ionization (ESI), secondary ion mass spectrometry (SIMS), field desorption (FD), fast atom bombardment (FAB), atmospheric pressure chemical ionization (APCI), and matrix assisted laser desorption ionization (MALDI) have been developed.

Among them, MALDI is a method in which a sample may be vaporized/ionized without decomposition of the sample with respect to a polymer substance and is known as a method that may be ideally applied to a biopolymer or a synthetic polymer generally having a large mass and being unstable to heat.

The principle of sampling in MALDI is called the dried droplet method, where a matrix that absorbs a laser well and an analyte are mixed and dissolved in a solvent, which is then dripped onto a sample plate and the solvent is dried to produce a target, and when the target is then irradiated with the laser, energy of the irradiated laser is transferred to the analyte through the crystallized matrix to ionize the analyte, and the molecules of the analyte that undergo the ionization process are accelerated by an electric field and reach a detector of Time-of-Flight Mass Spectrometry (TOF-MS). In this case, the mass of the molecule (ion) is measured using the principle that ions having a small mass-to-charge (m/z) ratio reach the detector faster than ions having a large mass-to-charge ratio.

MALDI has advantages that it may measure the molecule weight of high molecule weight substances such as a polymer, a protein, a peptide, and deoxyribonucleic acid (DNA), may perform analysis even if several kinds of components are mixed instead of one kind of component, may analyze a very small amount of sample because sensitivity is very sensitive, and has a shot analysis time.

However, even if the same MALDI mass spectrometer is used and the mass spectrum for the same analyte is obtained, it is well known fact that the obtained mass spectrum patterns are not the same depending on a method of preparing the target, a position at which the laser reaches the target, a wavelength of the laser used, pulse energy of the laser, a spot size at which the laser reaches, and the number of times the same spot is irradiated with the laser. The lack of reproducibility of such spectrum patterns is a serious problem in basic research, precision analysis, standardization, and the like using MALDI mass spectrometry.

Therefore, if the reproducibility of the spectrum patterns of MALDI may be improved, its applicability is expected to greatly increase.

As similar documents to a sample plate for MALDI mass spectrometry, Korean Patent No. 10-1204342 and Korean Patent Laid-Open Publication No. 10-2010-0051318 have been proposed, but it is still necessary to improve the problem described above.

PATENT DOCUMENT

Korean Patent No. 10-1204342 (2012.11.19)
Korean Patent Laid-Open Publication No. 10-2010-0051318 (2010.05.17)

DISCLOSURE

Technical Problem

An object of the present invention is to provide a sample plate for MALDI mass spectrometry having excellent sensitivity and excellent reproducibility of mass spectrum of MALDI.

Another object of the present invention is to provide a manufacturing method of a sample plate for MALDI mass spectrometry having excellent sensitivity and excellent reproducibility of mass spectrum of MALDI.

Another object of the present invention is to provide a MALDI mass spectrometry method using a sample plate for MALDI mass spectrometry having excellent sensitivity and excellent reproducibility of mass spectrum of MALDI.

Technical Solution

In one general aspect, a sample plate for matrix assisted laser desorption ionization (MALDI) mass spectrometry includes a plastic insulating plate; and metal dots formed on one surface of the plastic insulating plate and allowing a sample to be loaded on surfaces thereof. At the time of mass spectrometry, the metal dots may be electrically connected to a sample plate voltage application part of a MALDI mass spectrometer.

The sample plate for MALDI mass spectrometry may further include one or two or more metal layers formed to be in contact with a side surface, a bottom surface, a top surface, or these surfaces of the plastic insulating plate, and the metal layers may be electrically connected to the metal dots. At the time of mass spectrometry, the metal dots may be electrically connected to a sample plate voltage application part of a MALDI mass spectrometer through the metal layers.

In another general aspect, a sample plate for matrix assisted laser desorption ionization (MALDI) mass spectrometry includes a plastic insulating plate; metal dots formed on one surface of the plastic insulating plate and allowing a sample to be loaded on surfaces thereof; a bottom metal layer formed on the other surface of the plastic insulating plate; and metal dot vias formed to penetrate through the plastic insulating plate and being in contact with and electrically connected to the metal dots and the bottom metal layer.

The sample plate for MALDI mass spectrometry may further include a top metal layer formed on one surface of the plastic insulating plate on which the metal dots are formed.

The top metal layers may be in contact with and electrically connected to the metal dots, or may be spaced apart from and not be electrically connected to the metal dots. When the metal layer is electrically connected to the metal dots, one surface of the plastic insulating plate on which the metal dots are formed may include an insulating part formed between the metal dots and the top metal layer which are spaced apart from each other; and a connection part adjacent to the insulating part and formed by the metal dots and the top metal layer which are in contact with each other, or an entire periphery of the metal dots and the top metal layer may be in contact with each other. When the metal layer is not electrically connected to the metal dots, one surface of the plastic insulating plate on which the metal dots are formed may include an insulating part allowing the entire periphery of the metal dots and the top metal layer to be spaced apart from each other, adjacent to the entire periphery of the metal dots, and surrounding the entire periphery of the metal dots.

The sample plate for MALDI mass spectrometry may further include metal layer vias formed to penetrate through the plastic insulating plate, and being in contact with and electrically connected to the top metal layer and the bottom metal layer, wherein one surface of the plastic insulating plate on which the metal dots are formed may include the insulating part spaced apart from the entire periphery of the metal dots and the top metal layer, adjacent to the entire periphery of the metal dots, and surrounding the entire periphery of the metal dots.

In another general aspect, a sample plate for matrix assisted laser desorption ionization (MALDI) mass spectrometry includes a plastic insulating plate; metal dots formed on one surface of the plastic insulating plate; a top metal layer formed on one surface of the plastic insulating plate on which the metal dots are formed and electrically connected to the metal dots; a bottom metal layer formed on the other surface of the plastic insulating plate; and metal layer vias formed to penetrate through the plastic insulating plate and being in contact with and electrically connected to the top metal layer and the bottom metal layer.

One surface of the plastic insulating plate on which the metal dots are formed may include an insulating part formed between the metal dots and the top metal layer which are spaced apart from each other; and a connection part adjacent to the insulating part and formed by the metal dots and the top metal layer which are in contact with each other, or an entire periphery of the metal dots and the top metal layer may be in contact with each other.

In another general aspect, a sample plate for matrix assisted laser desorption ionization (MALDI) mass spectrometry includes a plastic insulating plate; metal dots formed on one surface of the plastic insulating plate; a top metal layer formed on one surface of the plastic insulating plate on which the metal dots are formed and electrically connected to the metal dots; and a side metal layer formed on a side surface of the plastic insulating plate and being in contact with and electrically connected to the top metal layer.

One surface of the plastic insulating plate on which the metal dots are formed may include an insulating part formed between the metal dots and the top metal layer which are spaced apart from each other; and a connection part adjacent to the insulating part and formed by the metal dots and the top metal layer which are in contact with each other, or an entire periphery of the metal dots and the top metal layer may be in contact with each other.

The sample plate for MALDI mass spectrometry may further include a bottom metal layer formed on the other surface of the plastic insulating plate and being in contact with and electrically connected to the top metal layer.

One surface of the plastic insulating plate on which the metal dots are formed may include an insulating part allowing the entire periphery of the metal dots and the top metal layer to be spaced apart from each other, adjacent to the entire periphery of the metal dots, and surrounding the entire periphery of the metal dots; and metal dot vias formed to penetrate through the plastic insulating plate and being in contact with and electrically connected to the metal dots and the bottom metal layer.

A diameter of the metal dot may be 100 μm to 5 mm.

The metal dots and the metal layers may independently contain any one or two or more selected from the group consisting of gold (Au), silver (Ag), copper (Cu), chromium (Cr), aluminum (Al), tungsten (W), zinc (Zn), nickel (Ni), iron (Fe), and an alloy thereof.

The plastic insulating plate may have a hydrophobic surface property, and the metal dots may have a hydrophilic surface property.

A surface of the metal dot may include a sample seating surface part positioned at a surface central portion of the metal dot; and a hydrophobic surface part surrounding a periphery of the sample seating part, and the hydrophobic surface part may have a hydrophobic property larger than that of the sample seating surface part.

The sample plate for MALDI mass spectrometry may further include a sample reservoir substrate attached to one surface of the plastic insulating plate, surrounding the peripheries of the metal dots, and including through-holes.

The sample reservoir substrate may include a gas passage through which an inert gas is discharged to through-holes.

The sample reservoir substrate may have a structure which is detachably attached to one surface of the plastic insulating plate.

In another general aspect, a manufacturing method for a sample plate for matrix assisted laser desorption ionization (MALDI) mass spectrometry includes forming a metal thin film on opposite surfaces of a plastic insulating plate; forming vias penetrating through the plastic insulating plate; and selectively etching the metal thin film on the opposite surfaces of the plastic insulating plate to form metal dots on one surface of the plastic insulating plate and form a bottom metal layer on the other surface of the plastic insulating plate. The metal dots and the bottom metal layer may be electrically connected to each other through the vias.

In another general aspect, a manufacturing method for a sample plate for matrix assisted laser desorption ionization (MALDI) mass spectrometry includes forming a metal thin film on opposite surfaces of a plastic insulating plate; selectively etching the metal thin film on the opposite surfaces of the plastic insulating plate to form metal dots and a top metal layer on one surface of the plastic insulating plate and form a bottom metal layer on the other surface of the plastic insulating plate; and forming a side metal layer by forming a metal thin film which is in contact with a side surface of the plastic insulating plate. The metal dots and the top metal layer may be electrically connected to each other, the top metal layer and the side metal layer may be electrically connected to each other, and the side metal layer and the bottom metal layer may be electrically connected to each other.

In another general aspect, a manufacturing method for a sample plate for matrix assisted laser desorption ionization (MALDI) mass spectrometry includes forming a metal thin film on opposite surfaces of a plastic insulating plate; selectively etching the metal thin film on the opposite surfaces of the plastic insulating plate to form metal dots and a top metal layer on one surface of the plastic insulating plate and form a bottom metal layer on the other surface of the plastic insulating plate; forming metal dot vias or metal layer vias penetrating through the plastic insulating plate; and forming a side metal layer by forming a metal thin film which is in contact with a side surface of the plastic insulating plate. The metal dots and the top metal layer may be electrically connected to each other, the top metal layer and the side metal layer may be electrically connected to each other, the side metal layer and the bottom metal layer may be electrically connected to each other, and the metal dots and the bottom metal layer may be electrically connected to each other through the vias.

In another general aspect, a matrix assisted laser desorption ionization (MALDI) mass spectrometry method is provided wherein a mass of a sample to be analyzed is analyzed by loading the sample to be analyzed on the metal dots of the sample plate for MALDI mass spectrometry according to the present invention and irradiating the sample to be analyzed with a laser to detach and ionize the sample.

Advantageous Effects

In the sample plate for MALDI mass spectrometry according to the present invention, the metal dots on which a sample to be analyzed is loaded and the metal wirings are positioned to be separated from each other through the plastic insulating plate and the metal dots and the metal wirings are electrically connected to each other through the vias or metal parts, thereby making it possible to reduce the energy transferred to the inside of the plate as compared with the sample plate using a metal base material at the time of irradiating the targets (metal dots) with the laser to thus concentrate the laser energy onto the targets and minimize the heat loss.

Accordingly, in the sample plate for MALDI mass spectrometry according to the present invention, since the sample to be analyzed may be homogeneously heated, the mass spectrum of MALDI having excellent reproducibility may be obtained even at the time of irradiating the same spot several times with the laser.

Even if the effects are not explicitly mentioned in the present invention, the effects described in the specification anticipated by the technical features of the present invention and the inherent effects thereof are treated as described in the specification of the present invention.

BEST MODE

Figure 1:
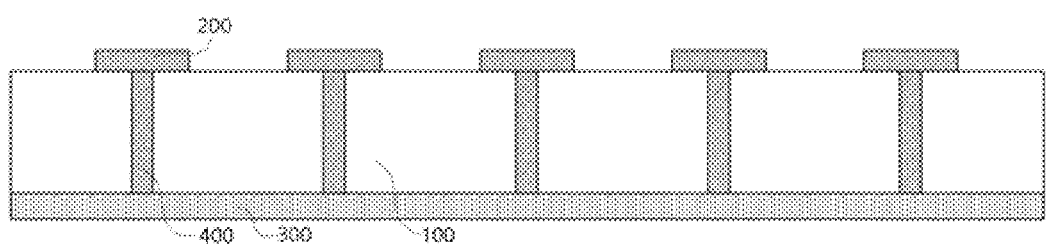
FIGS. 1 and 2 are a cross-sectional view and a top view of a side surface of a sample plate for MALDI mass spectrometry according to an embodiment of the present invention.

Hereinafter, a sample plate for MALDI mass spectrometry, a manufacturing method therefor, and a MALDI mass spectrometry method using the same will be described in detail with reference to the accompanying drawings.

The drawings described herein are provided as examples so that the spirit of the present invention can be sufficiently transferred to those skilled in the art. Therefore, the present invention is not limited to the accompanying drawings suggested below, but may be modified in different forms, and will be exaggerated in order to clear the spirit of the present invention.

Technical terms and scientific terms used herein have the general meaning understood by those skilled in the art to which the present invention pertains unless otherwise defined, and a description for the known function and configuration unnecessarily obscuring the gist of the present invention will be omitted in the following description and the accompanying drawings.

The singular forms of the terms used herein can be construed as including plural forms unless the context clearly dictates otherwise.

A unit of percentage (%) used herein without specifically stated otherwise means wt % unless otherwise defined.

Herein, "electrically connected" means that two objects electrically connected to each other are in contact with each other and are directly connected to each other or the two objects are indirectly connected to each other through a separate connection means.

A sample plate for MALDI mass spectrometry according to the present invention includes a plastic insulating plate; and metal dots formed on one surface of the plastic insulating plate and allowing a sample to be loaded on surfaces thereof. Here, at the time of mass spectrometry, the metal dots may be electrically connected to a sample plate voltage application part of a MALDI mass spectrometer.

The sample plate for MALDI mass spectrometry according to one example of the present invention may further include one or two or more metal layers formed to be in contact with a side surface, a bottom surface, a top surface, or these surfaces of the plastic insulating plate, and the metal layers may be electrically connected to the metal dots. Here, at the time of mass spectrometry, the metal dots may be electrically connected to the sample plate voltage application part of the MALDI mass spectrometer through the metal layers.

The sample plate for MALDI mass spectrometry according to one example of the present invention may further include a top metal layer formed on one surface of the plastic insulating plate on which the metal dots are formed.

According to one example of the present invention, the top metal layer may be in contact with and electrically connected to the metal dots, or may be spaced apart from the metal dots and may not be electrically connected to the metal dots.

As a specific example, in a case in which the metal layers are electrically connected to the metal dots, one surface of the plastic insulating plate on which the metal dots are formed may include an insulating part formed between the metal dots and the top metal layer which are spaced apart from each other; and a connecting part adjacent to the insulating part and formed by the metal dots and the top metal layer which are in contact with each other, or an entire periphery of the metal dots and the top surface metal layers may be in contact with each other.

As a specific example, in a case in which the metal layers are not electrically connected to the metal dots, one surface of the plastic insulating plate on which the metal dots are formed may include an insulating part allowing the entire periphery of the metal dots and the top metal layer to be spaced apart from each other, adjacent to the entire periphery of the metal dots, and surrounding the entire periphery of the metal dots.

The sample plate for MALDI mass spectrometry according to one example of the present invention may further include a bottom metal layer formed on the other surface of the plastic insulating plate.

The sample plate for MALDI mass spectrometry according to one example of the present invention may further include a side metal layer formed on a side surface of the plastic insulating plate and being in contact with and electrically connected to the top metal layer.

The sample plate for MALDI mass spectrometry according to one example of the present invention may further include metal dot vias formed to penetrate through the plastic insulating plate and being in contact with and electrically connected to the metal dots and the bottom metal layer.

The sample plate for MALDI mass spectrometry according to one example of the present invention may further include metal layer vias formed to penetrate through the plastic insulating plate and being in contact with and electrically connected to the top metal layer and the bottom metal layer.

Hereinafter, the sample plate for MALDI mass spectrometry according to the present invention, which may be more preferable, will be specifically described as first to third aspects. However, this is to merely divide the sample plate for MALDI mass spectrometry according to the present invention in order to more effectively explain the present invention, and thus the present invention should not be construed to be interpreted as a specific aspect or as a different invention. Further, it is to be understood that the components described in each aspect may be shared and applied to other aspects, even if the components described in each aspect are not separately described in other aspects.

Figure 2:
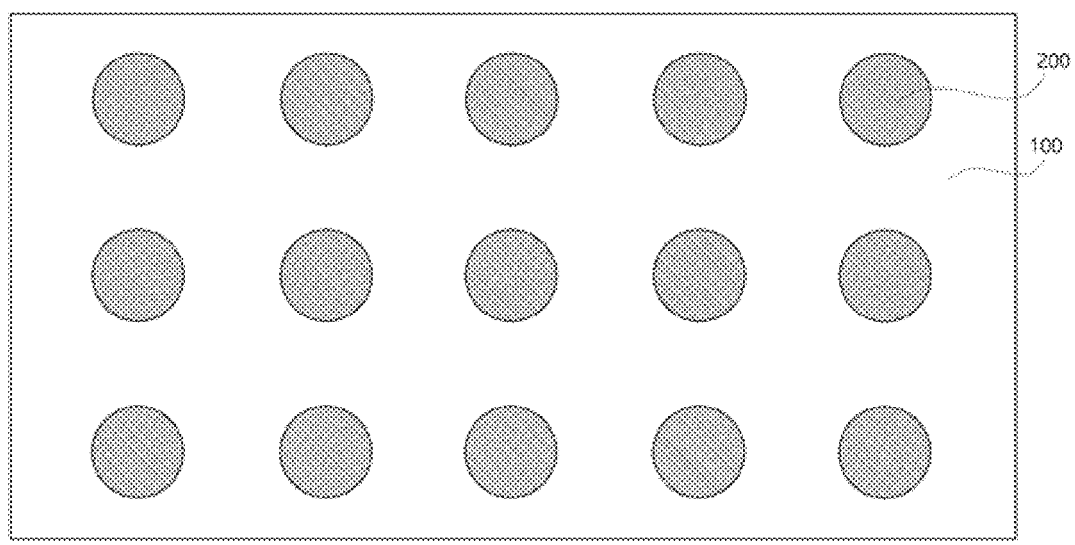

A sample plate of MALDI mass spectrometry of a first aspect according to one example of the present invention may include a plastic insulating plate; metal dots formed on one surface of the plastic insulating plate and allowing a sample to be loaded on surfaces thereof; a bottom metal layer formed on the other surface of the plastic insulating plate; and metal dot vias formed to penetrate through the plastic insulating plate and being in contact with and electrically connected to the bottom metal layer, as illustrated in FIGS. 1 and 2.

As such, the metal dots on which a sample to be analyzed is loaded and the bottom metal layer are positioned to be separated from each other through the plastic insulating plate and the metal dots and the bottom metal layer are electrically connected to each other through the vias, thereby making it possible to reduce (thermal) energy transferred to the inside of the plate as compared with the sample plate using a metal base material at the time of irradiating targets with a laser to thus concentrate the laser energy onto the targets and minimize heat loss. Accordingly, since the sample to be analyzed may be homogeneously heated, the mass spectrum of MALDI having excellent reproducibility may be obtained even at the time of irradiating the same spot several times with the laser.

Figure 3:
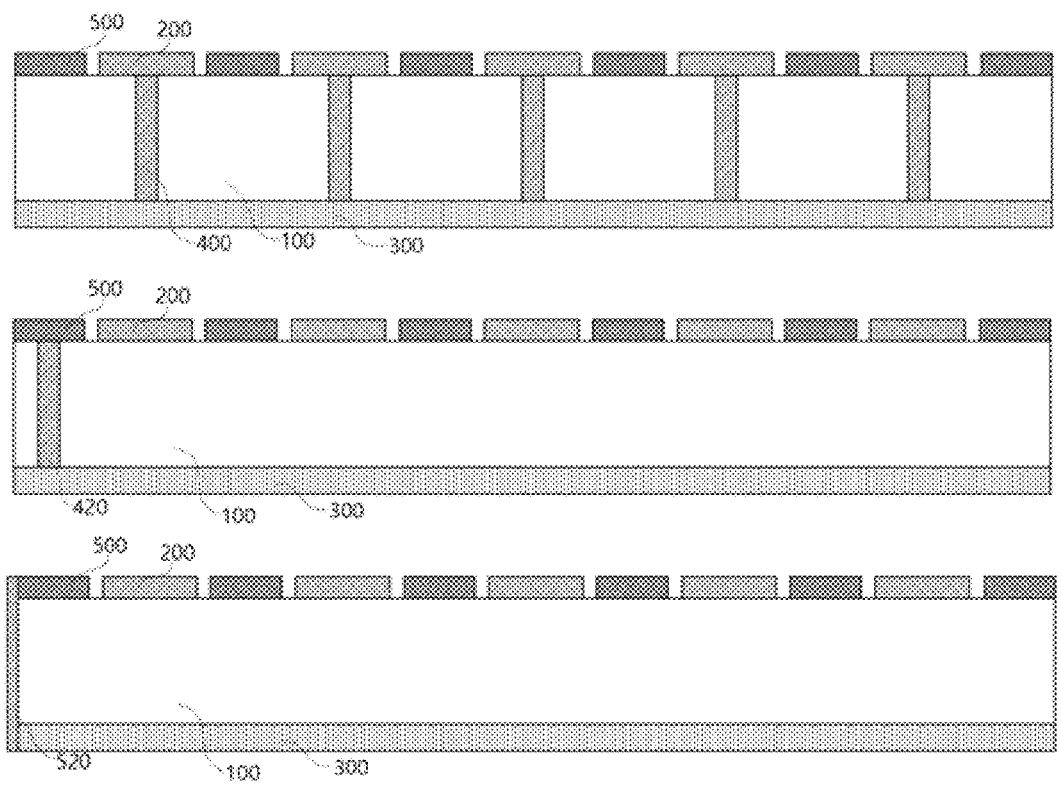
FIGS. 3 and 4 are cross-sectional views of a side surface of a sample plate for MALDI mass spectrometry including a metal layer according to an embodiment of the present invention.

The sample plate for MALDI mass spectrometry of the first aspect according to the present invention may further include a top metal layer formed on one surface of the plastic insulating plate on which the metal dots are formed and electrically connected to the metal dots, as illustrated in FIG. 3. In the case in which the top metal layer is formed, since a potential of the plastic insulating plate is determined by surface charges or the like, it is very easy to predict an electric field around the metal dots, and uncertainty of the electric field due to a presence of an insulator around the metal dots is reduced, thereby making it possible to predict that the electric field around the metal dots is uniformly formed without distortion.

In the sample plate for MALDI mass spectrometry of the first aspect according to the present invention, the top metal layer may be in contact with and electrically connected to the metal dots, or may be spaced apart from the metal dots and may not be electrically connected to the metal dots.

Figure 6:
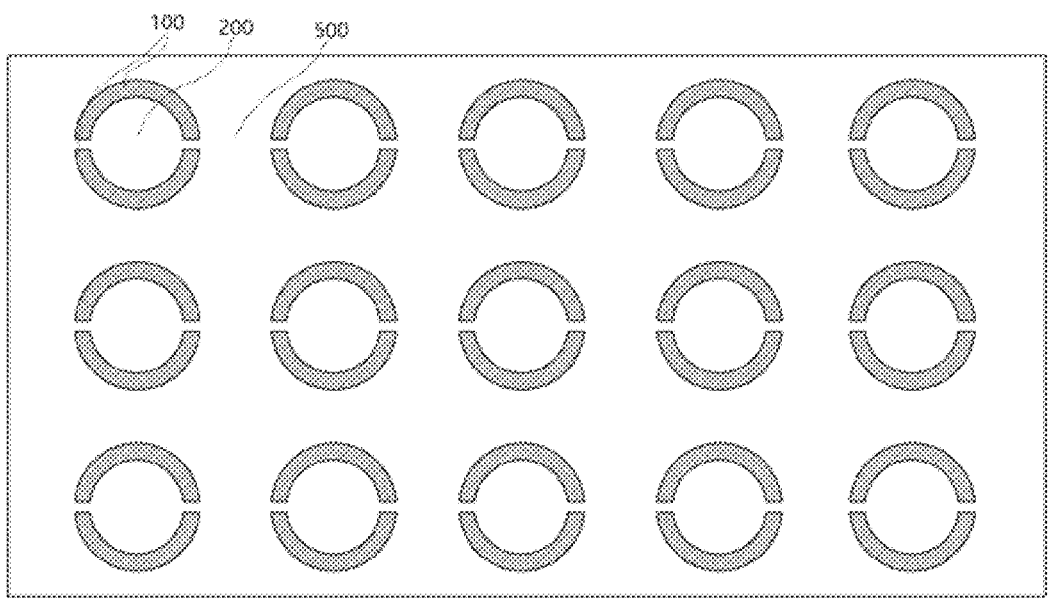

As a specific example of the first aspect, in a case in which the metal layers are electrically connected to the metal dots, as illustrated in FIG. 6, one surface of the plastic insulating plate on which the metal dots are formed may include an insulating part formed between the metal dots and the top metal layer which are spaced apart from each other; and a connecting part adjacent to the insulating part and formed by the metal dots and the top metal layer which are in contact with each other, or an entire periphery of the metal dots and the top surface metal layers may be in contact with each other. As a non-limiting example, the case in which one surface of the plastic plate includes the insulating part and the connecting part may be described as one example illustrated in FIG. 6. As a more specific example, an area of the connecting part may be 1 to 20% of the area of the insulating part. As a non-limiting example, in the case in which the entire periphery of the metal dots are in contact with the top metal layer, the entire periphery of the metal dots and the metal layers may be in contact with each other, or the metal dots and the metal layers may be integrated with each other. However, it is to be understood that this is merely a preferable example and the present invention is not limited thereto.

Figure 4:
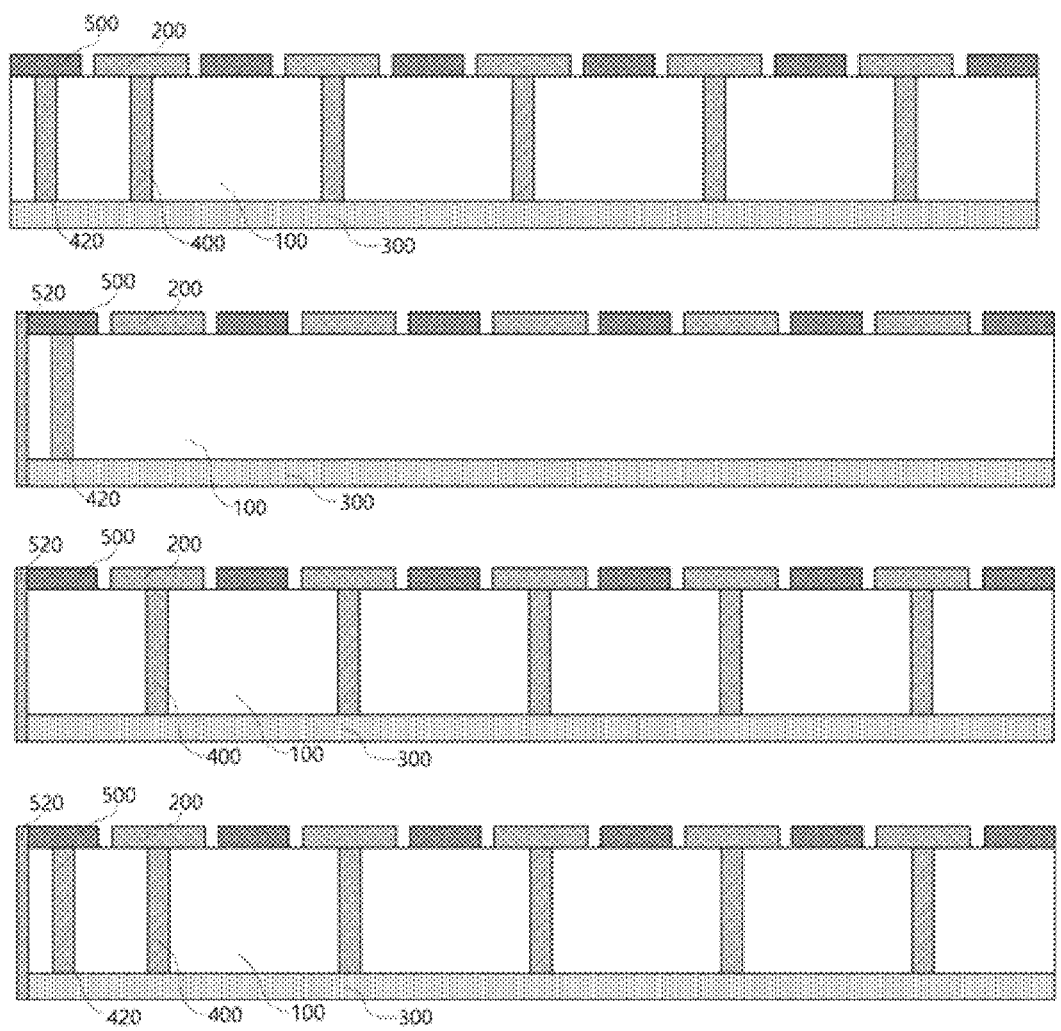
Figure 5:
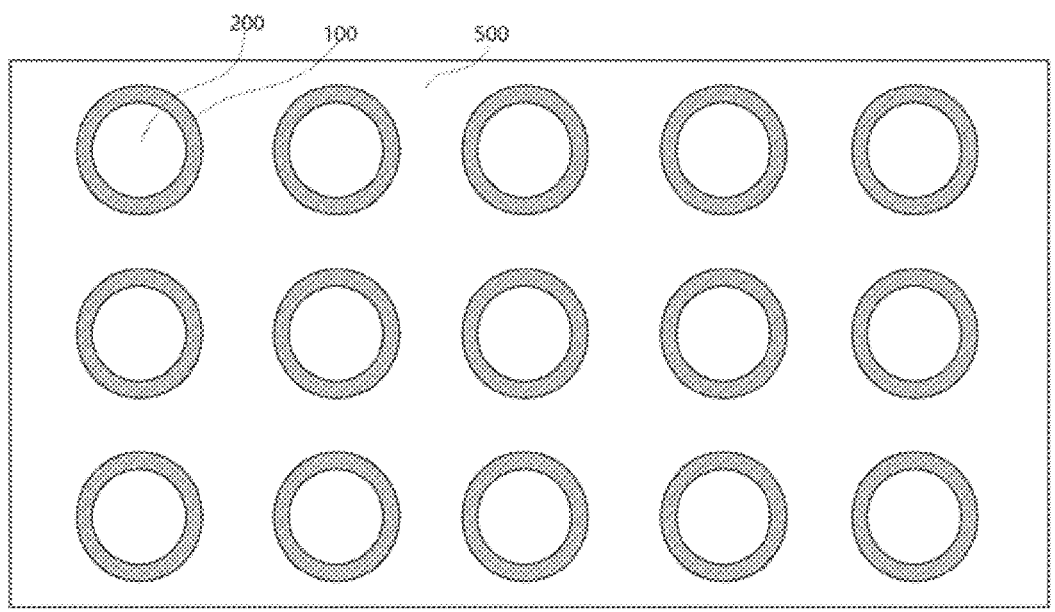
FIGS. 5 and 6 are top views of the sample plate for MALDI mass spectrometry.

As another specific example, in a case in which the metal layers are not electrically connected to the metal dots, as illustrated in FIG. 5, one surface of the plastic insulating plate on which the metal dots are formed may include an insulating part allowing the entire periphery of the metal dots and the top metal layer to be spaced apart from each other, adjacent to the entire periphery of the metal dots, and surrounding the entire periphery of the metal dots. The insulating part may be any insulating portion as long as it is spaced apart from the metal dots and surrounds the periphery of the metal dots, and a thickness thereof may be 0.2 to 20 mm, but the form and size thereof are not limited. The insulating part may refer to an insulating layer that separates the metal dots and a region of the top metal layer, or may refer to a surface of the plastic insulating plate exposed to the outside of the sample plate. In the case in which the insulating part means the surface of the plastic insulating plate exposed to the outside of the sample plate, since the top metal layer is not electrically connected to the bottom metal layer, the sample plate for MALDI of the second aspect according to the present invention may further include metal layer vias which are in contact with and electrically connected to the top metal layer and the bottom metal layer, and are formed to penetrate through the plastic insulating plate, as illustrated in FIG. 4 (a first drawing from the top to the bottom). In a case in which this is satisfied, the top metal layer is electrically connected to the metal dots through the metal layer vias even though the top metal layer is not in contact with the metal dots, thereby making it possible to easily apply a voltage while minimizing a transfer of thermal energy.

The sample plate of MALDI mass spectrometry of the second aspect according to one example of the present invention may include a plastic insulating plate; metal dots formed on one surface of the plastic insulating plate; a top metal layer formed on one surface of the plastic insulating plate on which the metal dots are formed and electrically connected to the metal dots; a bottom metal layer formed on the other surface of the plastic insulating plate; and metal layer vias formed to penetrate through the plastic insulating plate and being in contact with and electrically connected to the top metal layer and the bottom metal layer, as illustrated in FIG. 3 (a second drawing from the top to the bottom) and 4 (first, second, and fourth drawings from the top to the bottom).

That is, the sample plate for MALDI mass spectrometry of the second aspect may have a structure in which the metal layer vias formed to penetrate through the plastic insulating plate are in contact with and electrically connected to the top metal layer and the bottom metal layer, and the top metal layer and the metal dots are electrically connected to each other, as illustrated in FIG. 3 (a second drawing from the top to the bottom). Here, it is sufficient that the sample plate has a structure in which the top metal layer and the metal dots are electrically connected to each other, for example, the structure may be a structure in which the top metal layer and the metal dots are in contact with and electrically connected to each other as illustrated in FIG. 6, and may be a structure in which the metal dots and the top metal layer are in contact with the metal dot vias described above and are electrically connected to each other as illustrated in FIG. 3 (a first drawing from the top to the bottom).

As such, the metal dots on which a sample to be analyzed is loaded and the bottom metal layers are positioned to be separated from each other through the plastic insulating plate and the metal dots and the bottom metal layers are electrically connected to each other through the vias formed to penetrate through the plastic insulating plate, thereby making it possible to reduce laser energy transferred to the inside of the plate as compared with the sample plate using a metal base material at the time of irradiating targets with a laser to thus concentrate the laser energy onto the targets and minimize heat loss. Accordingly, since the sample to be analyzed may be homogeneously heated, the mass spectrum of MALDI having excellent reproducibility may be obtained even at the time of irradiating the same spot several times with the laser.

As a non-limiting example, the top metal layer and the metal dots may be in contact with and electrically connected to each other, for example, the entire periphery of the metal dots and the top metal layer may be in contact with each other, or one surface of the plastic insulating plate on which the metal dots are formed may include an insulating part formed between the metal dots and the top metal layer which are spaced apart from each other; and a connecting part adjacent to the insulating part and formed by the metal dots and the top metal layer which are in contact with each other. As a non-limiting example, in the case in which the entire periphery of the metal dots are in contact with the top metal layer, the entire periphery of the metal dots and the metal layers may be in contact with each other, or the metal dots and the metal layers may be integrated with each other. As a non-limiting example, as in one example illustrated in FIG. 6, an area of the connecting part may be 1 to 20% of the area of the insulating part. However, it is to be understood that this is merely a preferable example and the present invention is not limited thereto.

A sample plate of MALDI mass spectrometry of a third second aspect according to one example of the present invention may include a plastic insulating plate; metal dots formed on one surface of the plastic insulating plate; a top metal layer formed on one surface of the plastic insulating plate on which the metal dots are formed and electrically connected to the metal dots; and a side metal layer formed on a side surface of the plastic insulating plate and being in contact with and electrically connected to the top metal layer, as illustrated in FIGS. 11 to 13, FIG. 3 (a third drawing from the top to the bottom), and FIG. 4 (second, third, and fourth drawings from the top to the bottom).

Figure 11:
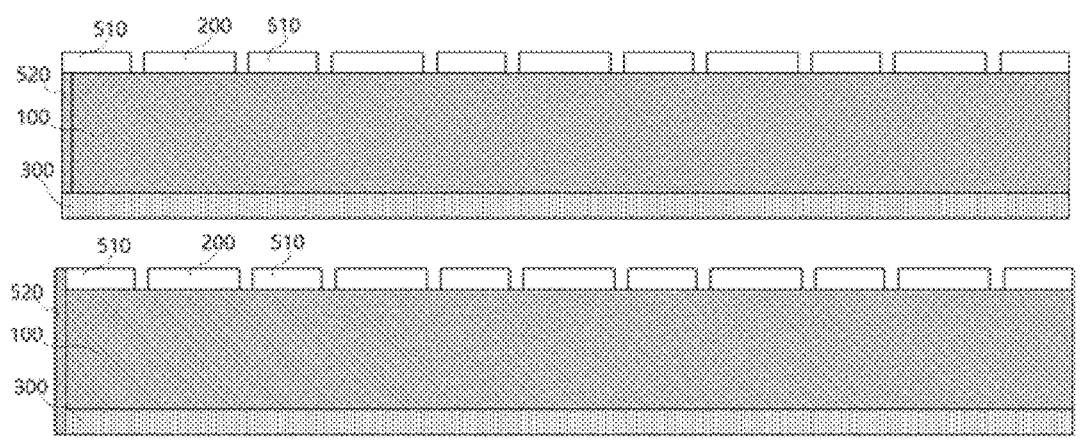
FIG. 11 is a cross-sectional view of a side surface of a sample plate for MALDI mass spectrometry in which a side metal layer is further provided on a side surface part according to an embodiment of the present invention.
Figure 12:
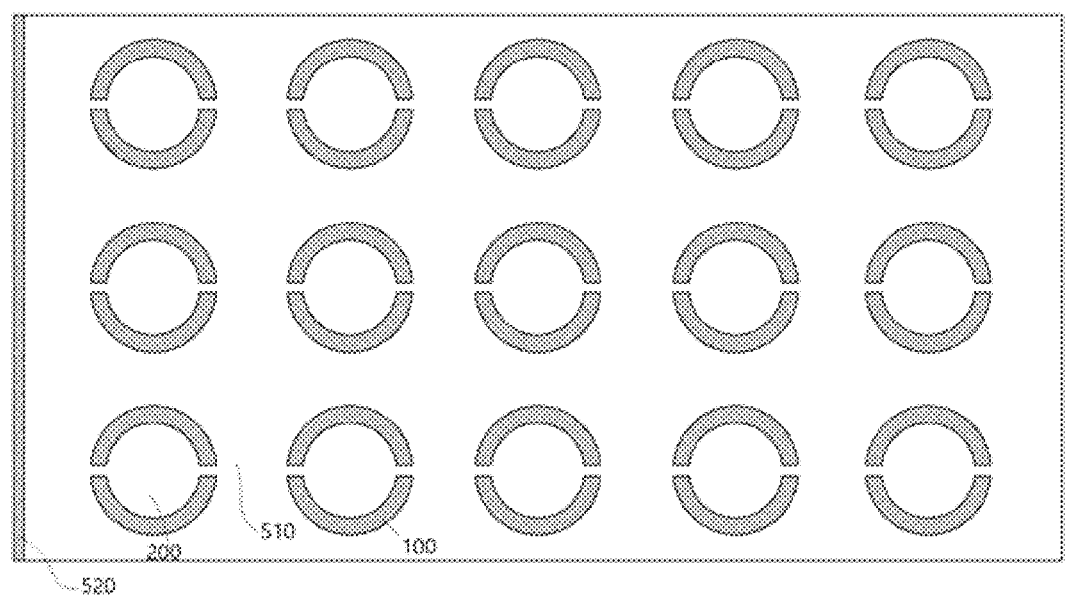
FIGS. 12 and 13 are top views of a sample plate for MALDI mass spectrometry in which a side metal layer is further provided on a side surface part according to another embodiment of the present invention.
Figure 13:
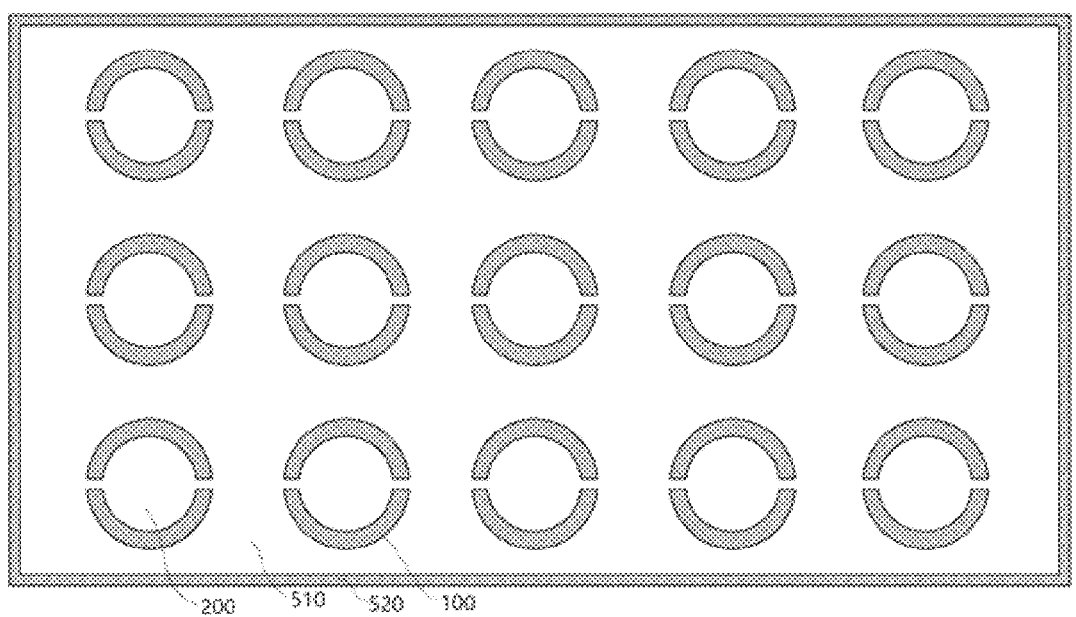
Figure 14:
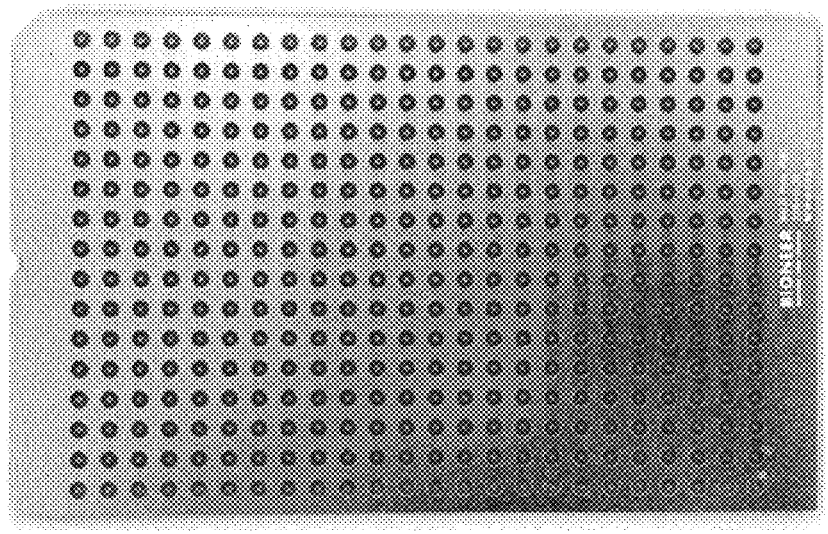
FIG. 14 shows an actual image of the sample plate for MALDI mass spectrometry according to an embodiment of the present invention and shows a front surface of the sample plate.

In the third aspect, the metal dots are electrically connected to the bottom metal layer by the side metal layer formed on a side surface part of the plastic insulating plate. The side metal layer may be formed to be in contact with the side surface part of the plastic insulating plate, specifically, the side surface of the plastic insulating plate. Specifically, the side metal layer may be formed to be in contact with a side surface of a bottom plastic insulator of the top metal layer as illustrated in FIG. 11 (a first drawing from the top to the bottom), and may also be formed to be in contact with the side surface of the top metal layer and the side surface of the plastic insulating plate as illustrated in FIG. 11 (a second drawing from the top to the bottom). In addition, the side metal layer may be formed on one side surface part of the plastic insulating plate as illustrated in FIG. 12, and a plurality of side surface metal layers may also be formed on a plurality of side surface parts of the plastic insulating plate, respectively. Here, the size and shape of the side metal layer are not limited as long as a voltage may be applied through the side metal layer and the side metal layer may connect the respective objects with each other, and for example, the side metal layer may have various shapes and sizes such as a plate shape, a wire shape, and the like. As an example, in terms of minimizing the transfer of thermal energy, it may be preferable that the side metal layer is formed to be 0.1 to 10% of an entire side surface of the plastic insulating plate, specifically, have an area of 0.5 to 5% of the plastic insulating plate. In addition, in terms of further minimizing the transfer of thermal energy, it may be preferable that a plurality of side metal layers are formed in a smaller unit size on the side surface of the plastic insulating plate. However, it is to be understood that this is merely a preferable example and the present invention is not limited thereto.

As such, the top metal layer electrically connected to the metal dots through the plastic insulating plate is in contact with and electrically connected to the side metal layer formed on the side surface part of the plastic insulating plate, thereby making it possible to reduce (thermal) energy transferred to the inside of the plate as compared with the sample plate using a metal base material at the time of irradiating targets with a laser to thus concentrate the laser energy onto the targets and minimize heat loss. Accordingly, since the sample to be analyzed may be homogeneously heated, the mass spectrum of MALDI having excellent reproducibility may be obtained even at the time of irradiating the same spot several times with the laser.

The sample plate for MALDI mass spectrometry of the third aspect according to one example of the present invention may further include a bottom metal layer formed on the other surface of the plastic insulating plate and being in contact with and electrically connected to the top metal layer in some cases.

In the sample plate for MALDI of the third aspect according to one example of the present invention, in some cases, one surface of the plastic insulating plate on which the metal dots are formed may include an insulating part allowing an entire periphery of the metal dots and the top metal layer to be spaced apart from each other, adjacent to the entire periphery of the metal dots, and surrounding the entire periphery of the metal dots; and metal dot vias formed to penetrate through the plastic insulating plate and being in contact with and electrically connected to the metal dots and the bottom metal layer.

In the third aspect, the bottom metal layer and the metal dot vias may be used for electrical connection of the metal dots and other metal layers, and such metal layers may also be for connection with a voltage applying part.

In the third aspect, a connection structure of the top metal layer electrically connected to the metal dots may be any structure as long as the metal dots and the top metal layer may be electrically connected to each other. As a specific one example, as illustrated in FIG. 6, the structure may be a structure in which the top metal layer and the metal dots are in direct contact with and electrically connected to each other, or may also be an indirect and electrical connection structure in which the top metal layer and the metal dots are not in contact with each other, but are connected to each other through other connection means. An example of the indirect and electrical connection structure may include a structure in which the metal dots and the metal dot vias are in contact with each other, the metal dot vias are in contact with the bottom metal layer, and the bottom metal layer is in contact with the side metal layer such that the top metal layer and the metal dots are indirectly and electrically connected to each other by the top metal layer which is in contact with the side metal layer, as illustrated in FIG. 4 (a third drawing from the top to the bottom).

As described above, in the sample plate for MALDI mass spectrometry according to the present invention, the top metal layer may also be positioned to be spaced apart from the metal dots, and may be positioned to be in contact with the metal dots. As a non-limiting example, the top metal layer may be positioned to be in contact with the entire periphery of the metal dots, that is, the plastic insulating plate or the insulating part is not positioned between the top metal layer and the metal dots, and the metal dot and the top metal layer may also be formed as a single metal plate (metal dot+top metal layer).

As described above, the present invention may include various aspects such as the first to third aspects, and in this case, it is to be understood that the components described in each aspect may be shared and applied to other aspects, even if components are not separately described in each aspect. That is, a combination of the components of the sample plate for MALDI according to one example described above is specifically described according to the fact that such a combination is more preferable in the present invention, and it is to be understood that possible combinations of other mentioned respective components are also included as the constitution of the present invention.

The vias are to electrically connect the metal dots and the metal layers with each other and may be formed in through holes penetrating through the plastic insulating plate, and the diameter and shape of the vias are not particularly limited as long as the vias may connect the metal dots and the metal layers with each other. Specifically, it may be desirable that the diameter of the via is relatively small compared to the diameter of the metal dot so that the metal dot may be stably bonded to one surface of the plastic insulating plate. As one specific example, the diameter of the via may be between 10 μm and 1 mm, and more preferably between 50 and 500 μm, but is not limited thereto.

The via is not particularly limited as long as it may penetrate through the plastic insulating plate to electrically connect the metal dot and the bottom metal layer with each other, but an inner surface of the through hole penetrating through the plastic insulating plate may be coated with a metal or a metal plug may be press-fitted into the through hole so that the metal dot and the bottom metal layer are electrically connected to each other.

Here, the metal coating or the metal plug may be formed of the same metal as or a different metal from the bottom metal layer, for example, a metal element material or the like. As a more specific example, the via may be formed by including any one or two or more selected from the group consisting of gold (Au), silver (Ag), copper (Cu), chromium (Cr), aluminum (Al), tungsten (W), zinc (Zn), nickel (Ni), iron (Fe), and an alloy thereof. In addition, in terms of cost savings while ensuring excellent electrical conductivity, it is preferable that the via contains copper (Cu) or a copper alloy. However, it is to be understood that this is merely a preferable example and the present invention is not limited thereto.

The plastic insulating plate is a plastic substrate having insulating property and is not particularly limited as long as it may relatively reduce the thermal transfer as compared with, for example, the metal dots, the bottom metal layer, the vias, or the like. As a non-limiting example, the plastic insulating plate may be a substrate formed of epoxy, paper-phenolic resin, polyimide (PI), polyethyleneterephthalate (PET), polyethylenenaphthalate (PEN), polymethylmethacrylate (PMMA), polyetheretherketone (PEEK), polycarbonate (PC), polyethersulfone (PES), polyarylite, cyclicolefincopolymer (COC), or the like, but is not limited thereto. The thickness of the plastic insulating plate is sufficient for the thickness of the sample plate which is usually used so as not to be easily deformed while providing sufficient insulating property, and may be 2 to 5 mm as a specific example, but is not limited thereto. Here, the paper-phenolic resin substrate may refer to a substrate prepared by impregnating a phenolic resin on a paper base, and heating and compressing a plurality of stacked sheets of the paper. However, it is to be understood that this is merely a preferable example and the present invention is not limited thereto.

The metal dot is a portion on which a sample to be analyzed to be mass-analyzed is substantially loaded, and is a point to which the laser is irradiated at the time of MALDI spectrometry. The metal dot may be formed in a desired form on one surface of the plastic insulating plate, one or two or more metal dots may be formed on one surface of the plastic insulating plate, and when a plurality of metal dots are formed, the metal dots may have a periodic and regular arrangement or an aperiodic and irregular arrangement.

A material of the metal dot according to one example of the present invention is a material that allows the sample to be analyzed to be loaded in the art, and is not particularly limited as long as it is an electrically conductive material, and may be, for example, a metal element material or the like. As a non-limiting example, the metal dot may include any one or two or more selected from the group consisting of gold (Au), silver (Ag), copper (Cu), chromium (Cr), aluminum (Al), tungsten (W), zinc (Zn), nickel (Ni), iron (Fe), and an alloy thereof, but does not exclude other materials commonly used in the art.

As the metal dot is a component on which the sample to be analyzed is loaded as described above, it is preferable that the metal dot has a proper size so that the sample to be analyzed aggregates well, and it is more preferable that the metal dot has a property similar to that of the sample to be analyzed.

As one specific example, a diameter of the metal dot may be 100 μm to 5 mm, specifically 100 μm to 2 mm, and more specifically 300 μm to 1 mm. When a sample solution to be analyzed is dripped in the range described above to form a target, an effect that the target is aggregated to the metal dot may be excellent, and as the size of metal dot is smaller, heat dissipation may be suppressed and heat loss may be minimized.

Further, in order to further increase the effect that the sample to be analyzed is aggregated to the metal dot, it is preferable that the metal dot has a property similar to the sample to be analyzed or the sample solution to be analyzed, and the plastic insulating plate has a property opposite to that of the metal dot.

Figure 7:
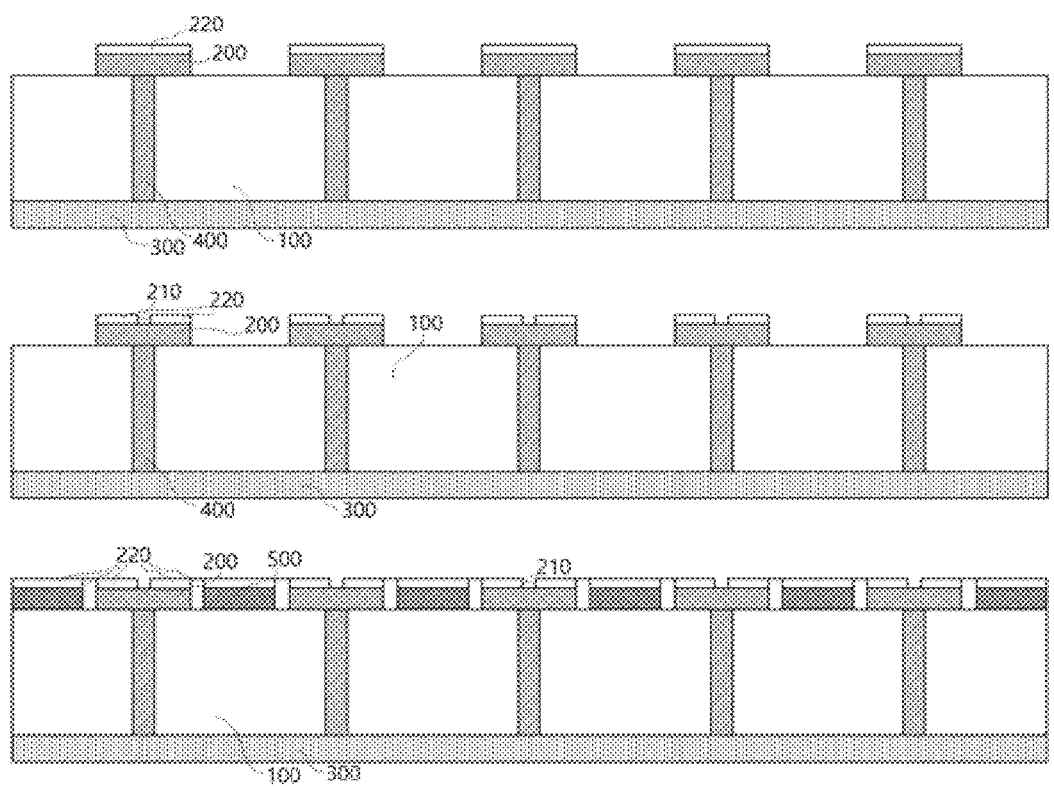
FIG. 7 is a cross-sectional view of a side surface of a sample plate for MALDI mass spectrometry including a metal dot having a hydrophobic surface part according to an embodiment of the present invention.

As a non-limiting example, when the sample solution to be analyzed is hydrophilic, the plastic insulating plate or a metal layer described below may have a hydrophobic surface property, and the metal dot having a hydrophilic surface property may be effective in aggregating the sample to be analyzed to the metal dot. To this end, when the plastic insulating plate is manufactured, the plastic insulating plate may be manufactured using a polymer having a hydrophobic property, or as illustrated in FIG. 7, after manufacturing the substrate, a surface of the substrate may be treated with a hydrophobic substance to manufacture the plastic insulating plate having the hydrophobic surface property. In contrast, in the case of the metal dot, a surface of the metal dot may be treated with a hydrophilic substance to manufacture the metal dot having the hydrophilic surface property.

Figure 9:
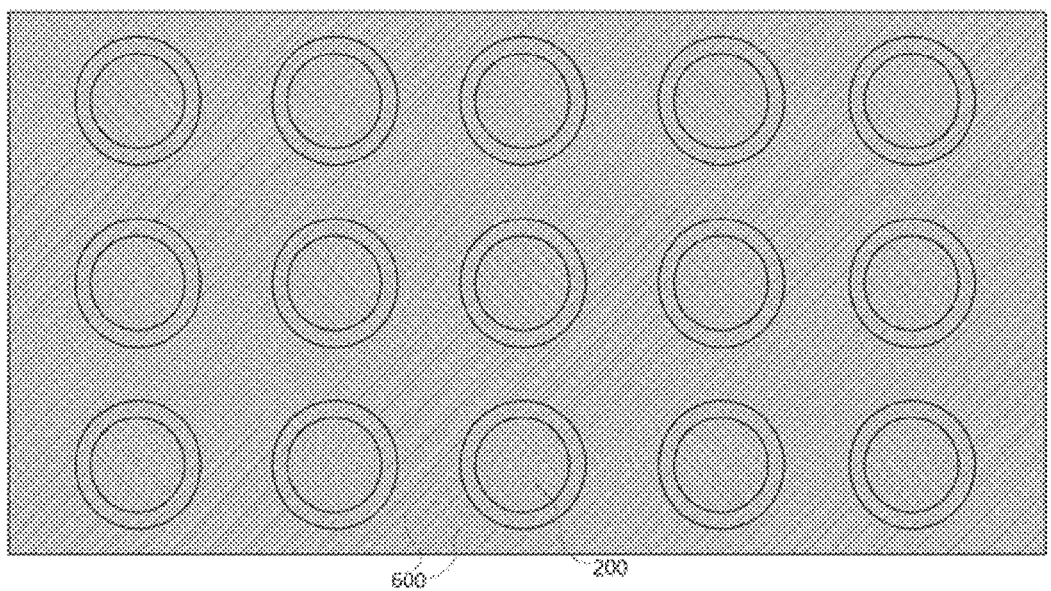

As an example that may be more preferred, the surface of the metal dot may include a sample seating surface part positioned at a surface central portion of the metal dot; and a hydrophobic surface part surrounding a periphery of the sample seating part, and the hydrophobic surface part may have a hydrophobic property larger than that of the sample seating surface part, as illustrated in FIG. 7. The sample seating surface part is a part on which the sample to be analyzed is actually seated and may allow the sample to be analyzed to be aggregated to the sample seating surface part by the hydrophobic surface part. The sample seating surface part may have any diameter as long as the sample may be seated on the sample seating surface part, and for example, the diameter of the sample seating surface part may be 100 μl or more and may be smaller than the diameter of the metal dot. In addition, as illustrated in FIG. 9, the hydrophobic surface part may also be formed on the surface of the top metal layer. However, it is to be understood that this is merely a preferable example and the present invention is not limited thereto.

In addition, in one example of the present invention, when the insulating part such as the plastic insulating plate exists between the top metal layer and the metal dots, the hydrophobic surface part may also be positioned on the insulating part as illustrated in FIG. 7.

In one example of the present invention, the hydrophobic surface part may contain any one or two or more selected from the group consisting of a fluoro-based compound containing any one or two or more selected from the group consisting of tetrafluoroethylene, hexafluoropropylene, chlorotrifluoroethylene, trifluoroethylene, vinylidene fluoride, octafluorobutylene, pentafluorophenyl trifluoroethylene, pentafluorophenyl ethylene, polymers containing repeat units derived therefrom, fluorine containing acrylate polymers, perfluoropolyethers, and the like; a silane-based compound having an alkyl group containing any one or two or more selected from the group consisting of alkyltrichlorosilane, alkyltrimethoxysilane, alkyltriethoxysilane, dichlorodialkylsilane, and the like; a silane compound having an amine group and a silicone oil containing one or more selected from the group consisting of dimethicone, methicone, and the like; an oxide/polymer nanocomposite containing one or more selected from the group consisting of manganese oxide/polystyrene ($MnO_2$/PS) nanocomposite and zinc oxide/polystyrene (ZnO/PS) nanocomposite exhibiting superhydrophobicity; a composition containing carbon nanotubes; a silica nano-coating agent; and the like. However, it is to be understood that this is merely a preferable example and the present invention is not limited thereto.

As a non-limiting example, when the sample solution to be analyzed is hydrophobic, the plastic insulating plate or a metal layer described below may have a hydrophilic surface property, and the metal dot having a hydrophobic surface property may be effective in aggregating the sample to be analyzed to the metal dot.

As described above, when the sample to be analyzed is aggregated in a very narrow region and has a high degree of integration, even with a small sample volume, the mass spectrometry may be performed with high sensitivity and the mass spectrum of MALDI having excellent reproducibility may be obtained.

In the present invention, by applying a voltage to the metal dot, mass spectrometry is finally possible, and a variety of known methods or a method described below for applying a voltage to the metal dot may be used. As a specific example, in order to enable an operation of a MALDI mass spectrometry equipment, the MALDI mass spectrometer may include a voltage application part for applying a voltage to the sample plate, and it is sufficient to allow the voltage to be applied to the metal dot from the voltage applying part. As an example of a specific means for allowing the voltage to be applied to the metal dot, the voltage application part may also be in direct contact with and electrically connected to the metal dots of the sample plate for MALDI mass spectrometry according to the present invention, but it is preferable that the voltage application part is electrically connected to the metal layers or the vias so as not to be directly connected to the metal dots. As a specific example, the voltage application part may be in direct contact with and electrically connected to any one or two or more selected from the metal dot vias, the metal layer vias, the top metal layer, the bottom metal layer, and the side metal layer. It is more preferable that the voltage application part is directly connected to the bottom metal layer electrically connected to the metal dots.

Although the metal dots are formed in the form of dots or circles on one surface of the plastic insulating plate, the metal layers provides an electrical connection through the structure described above so that the operation of the MALDI mass spectrometry equipment may be more smoothly enabled, and may be designed to be in contact with the voltage application part for applying the voltage to the sample plate in the MALDI mass spectrometry equipment. Further, since a substantially electrical connection with the metal dots may be performed through the vias or the metal layers, it is preferable that a pattern of the bottom metal layer is formed so that the bottom metal layer covers one end of the vias adjacent to the surface of the plastic insulating plate on which the bottom metal layer is formed, or is in contact with the side metal layer. As a non-limiting example, in a case in which the bottom metal layer is not connected to one end of the vias or is not in contact with the side metal layer, it may be difficult to apply the voltage to the metal dots and it may be difficult to perform the MALDI mass spectrometry, that is, according to a non-limiting example, since the bottom metal layer has a structure in which the bottom metal layer is connected to the voltage application part for applying the voltage to the sample plate and is connected to the metal dots through the vias in an operation of inserting the sample plate into the mass spectrometer and analyzing the sample plate, an effect of performing a more accurate mass analysis and minimizing a degradation of the reproducibility due to a temperature deviation according to the number of times of laser irradiation may be further improved.

A material of the metal layer is not particularly limited as long as it is known to have excellent electrical conductivity, for example, a metal element material or the like. As a more specific example, the metal layer may contain any one or two or more selected from the group consisting of gold (Au), silver (Ag), copper (Cu), chromium (Cr), aluminum (Al), tungsten (W), zinc (Zn), nickel (Ni), iron (Fe), and an alloy thereof. In terms of cost savings while ensuring excellent electrical conductivity, it is more preferable that the metal layer contains copper (Cu) or a copper alloy. However, it is to be understood that this is merely a preferable example and the present invention is not limited thereto.

The "metal layer" referred to in the present specification is not limited in its shape and may have, for example, in the form of a plate, specifically a coating plate.

The sizes of the "metal dot" and "metal layer" referred to in the present specification are not particularly limited as they may be appropriately adjusted depending on the scale, and an average thickness thereof may be, for example, 10 μm to 200 μm, but it is to be understood that the present invention is not limited thereto. In addition, the size of the "plastic insulating plate" referred to in the present specification is not particularly limited as it may be appropriately adjusted depending on the scale, and an average thickness thereof may be, for example, 0.5 mm to 3 mm, but it is to be understood that the present invention is not limited thereto.

The sample plate for MALDI mass spectrometry according to the present invention may further include a marking region for identification adjacent to the periphery of the metal dots. The metal dot regions which are the regions where the sample is loaded by the insulating part described above may be identified, and in a case in which it is difficult to identify such a region or in order to further complement the identification of such a region, the marking region for identification adjacent to the periphery of the metal dots may be further included. Such a marking region may be formed by various known methods such as a coating, a painting, and the like.

Figure 8:
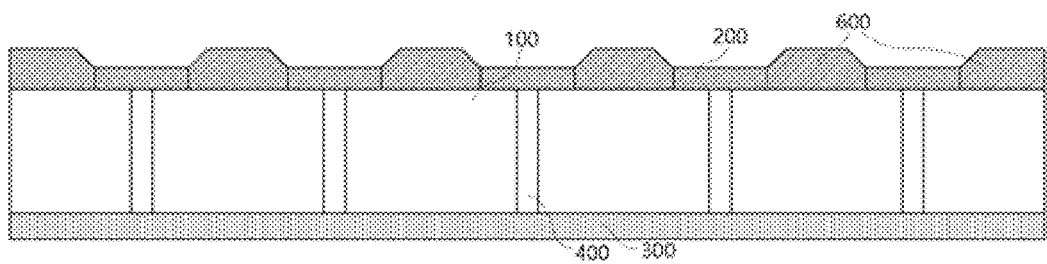
FIGS. 8 and 9 are a cross-sectional view and a top view of a side surface of a sample plate for MALDI mass spectrometry including a sample reservoir substrate according to an embodiment of the present invention.
Figure 10:
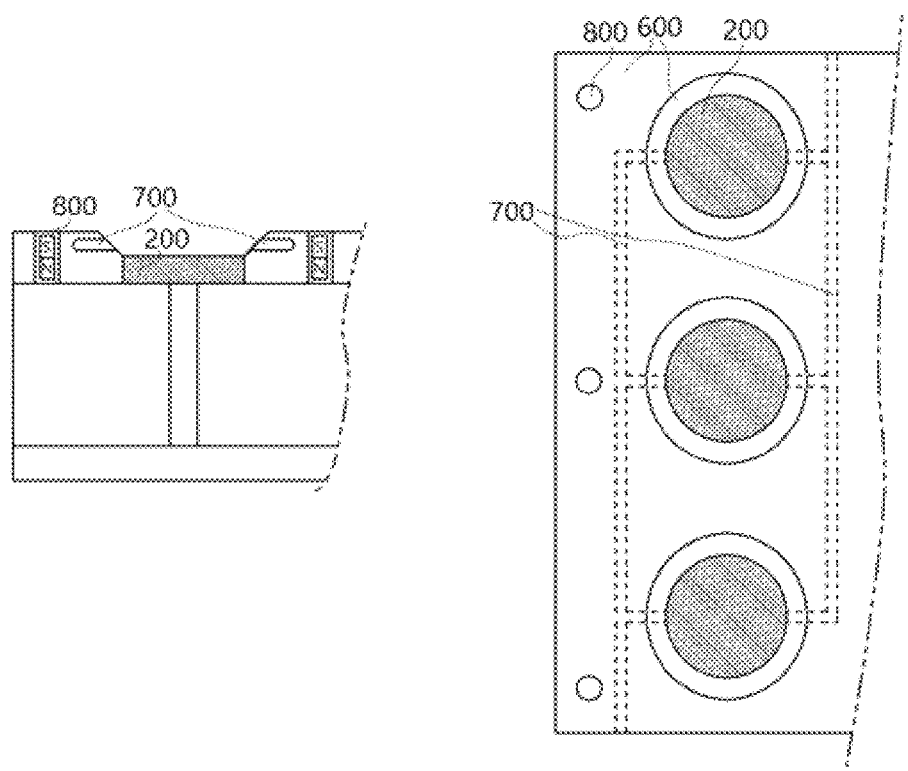
FIG. 10 is a cross-sectional view and a perspective top view of a side surface of a sample plate for MALDI mass spectrometry including a sample reservoir substrate having a gas passage according to an embodiment of the present invention.

The sample plate for MALDI mass spectrometry according to one example of the present invention may further include a sample reservoir substrate attached to one surface of the plastic insulating plate and including through-holes surrounding the periphery of the metal dots, as illustrated in FIGS. 8 to 10. Here, the sample reservoir substrate may have a shape in which the periphery of the metal dots is in contact with inner surfaces of the through-holes of the sample reservoir substrate, unlike the metal layers surrounding the periphery of the metal dots to be spaced apart from the periphery of the metal dots.

As such, as the sample plate may have the sample reservoir substrate, there are advantages that the sample solution to be analyzed may be directly dripped on the sample plate and the sample to be analyzed may be loaded to the metal dots, and as a result, since the sample to be analyzed may be sampled in an extremely uniform and fine manner, more excellent reproducibility may be ensured at the time of mass spectrometry.

In one example of the present invention, it is preferable that the sample reservoir substrate is separated from the sample plate for MALDI mass spectrometry for efficient laser irradiation at the time of mass spectrometry after the sample to be analyzed is loaded to form the target, and therefore, the sample reservoir substrate may be detachably attached to one surface of the plastic insulating plate.

As such, as the sample reservoir substrate is subsequently separated from the sample plate for MALDI mass spectrometry, a material of the sample reservoir substrate is not particularly limited as long as the sample reservoir substrate is manufactured to have a desired shape, and the sample reservoir substrate may be formed of any material such as a metal, a metal oxide, a ceramic, or a polymer, but it is preferable that the through-hole has a hydrophobic surface property on the inner surface thereof in order to enhance the aggregation effect of the sample to be analyzed to the metal dot. However, it is to be understood that this is merely a preferable example and the present invention is not limited thereto.

In addition, as described above, a shape of the through-hole itself of the sample reservoir substrate is not particularly limited as long as it has the shape in which the inner surface of the through-hole of the sample reservoir substrate and the periphery of the metal dot are in contact with each other, and the sample reservoir substrate may have, for example, a cylindrical shape or a funnel shape. However, it is to be understood that this is merely a preferable example and the present invention is not limited thereto.

Further, the sample reservoir substrate according to one example of the present invention may include gas passages through which an inert gas may be discharged through the through-holes, in order to rapidly dry a solvent in the sample solution to be analyzed which is injected into the through-holes, as illustrated in FIG. 10. The shape, size, and the like of the gas passage are not limited as long as the gas passage may transfer the gas to the through-holes and the number of passages is also limited, and as one example, the gas passage is indicated by the dotted line illustrated in the right drawing of FIG. 10, the right drawing of FIG. 10 is a perspective top view and a top view of the sample plate, and the illustrated gas passage is in a state being perspective as the dotted line. Here, the inert gas may be helium (He), neon (Ne), nitrogen (N2), or argon (Ar), but is not limited thereto.

In addition, the sample reservoir substrate according to one example of the present invention may include magnets inside the sample reservoir substrate so that the sample reservoir substrate may be detachably attached to the sample plate for MALDI mass spectrometry, and here, the magnet may refer to a permanent magnet. To this end, it is possible to further provide an attachment assisting equipment bonded to a bottom surface of the sample plate for MALDI mass spectrometry, that is, a surface opposing the surface to which the sample reservoir substrate is attached, and the attachment assisting equipment may also include the magnet. By bonding the sample plate for MALDI mass spectrometry on such an attachment assisting equipment and adjusting a displacement of the magnet included in the attachment assisting equipment, the magnet included in the attachment assisting equipment and the magnets included in the sample reservoir substrate are adjusted so as to be attracted to each other or so as not to be attracted to each other, thereby making it possible to detach or attach the sample reservoir substrate from or to the sample plate for MALDI mass spectrometry. However, it is to be understood that this is merely a preferable example and the present invention is not limited thereto.

Hereinafter, a manufacturing method of a sample plate for MALDI mass spectrometry according to the present invention will be described in detail. However, this is merely intended to effectively describe the manufacturing method of the sample plate for MALDI mass spectrometry according to the present invention as specific examples, and the present invention should not be construed as being limited to the specific aspects. In addition, it is to be understood that the respective components for the manufacturing method of the sample plate for ALDI mass spectrometry may be shared with and applied to the components of the sample plate for ALDI mass spectrometry described above.

A manufacturing method of a sample plate for MALDI mass spectrometry according to one aspect of the present invention may include forming a metal thin film on opposite surfaces of a plastic insulating plate; forming vias penetrating through the plastic insulating plate; and selectively etching the metal thin film on the opposite surfaces of the plastic insulating plate to form metal dots on one surface of the plastic insulating plate and form a bottom metal layer on the other surface of the plastic insulating plate. Here, the metal dots and the bottom metal layer may be electrically connected to each other through the vias.

A manufacturing method of a sample plate for MALDI mass spectrometry according to one aspect of the present invention may include forming a metal thin film on opposite surfaces of a plastic insulating plate; selectively etching the metal thin film on the opposite surfaces of the plastic insulating plate to form metal dots and a top metal layer on one surface of the plastic insulating plate and form a bottom metal layer on the other surface of the plastic insulating plate; and forming a side metal layer by forming a metal thin film which is in contact with a side surface of the plastic insulating plate. Here, the metal dots and the top metal layer may be electrically connected to each other, the top metal layer and the side metal layer may be electrically connected to each other, and the side metal layer and the bottom metal layer may be electrically connected to each other.

A manufacturing method of a sample plate for MALDI mass spectrometry according to one aspect of the present invention may include forming a metal thin film on opposite surfaces of a plastic insulating plate; selectively etching the metal thin film on the opposite surfaces of the plastic insulating plate to form metal dots and a top metal layer on one surface of the plastic insulating plate and form a bottom metal layer on the other surface of the plastic insulating plate; forming metal dot vias or metal layer vias penetrating through the plastic insulating plate; and forming a side metal layer by forming a metal thin film which is in contact with a side surface of the plastic insulating plate. Here, the metal dots and the top metal layer may be electrically connected to each other, the top metal layer and the side metal layer may be electrically connected to each other, the side metal layer and the bottom metal layer may be electrically connected to each other, and the metal dots and the bottom metal layer may be electrically connected to each other through the vias.

As a specific example, the sample plate for MALDI mass spectrometry may be manufactured based on a printed circuit board (PCB), that is, the metal layers and the vias formed on and in the plastic insulating plate may be formed through a typical method used in manufacturing the printed circuit board.

First, the forming of the metal thin film on the opposite surfaces of the plastic insulating plate is described, and here, the plastic insulating plate may be prepared from the same material as that described above.

In the present invention, a method of forming the metal thin film may be a method commonly used in a printed circuit board (PCB) process, and for example, chemical vapor deposition, physical vapor deposition, or a mixture thereof may be used. As a more specific example, the metal thin film may be formed by any one or a combination of two or more selected from electroless plating, electroplating, DC sputtering, magnetron sputtering, ebeam evaporation, thermal evaporation, laser molecular beam epitaxy (LMBE), pulsed laser deposition (PLD), vacuum deposition, atomic layer deposition (ALD), and plasma enhanced chemical vapor deposition (PECVD), but the method of forming the metal thin film is not necessarily limited thereto. Here, a thickness of the metal thin film is adjustable as desired, and may be, for example, 0.1 to 30 μm, but is not limited thereto.

Next, the forming of the vias penetrating through the plastic insulating plate is described.

In one example of the present invention, the via is not particularly limited as long as it penetrates through the plastic plate and may be electrically connected to the metal dots or the metal layers, but may be formed by forming a through-hole penetrating through the plastic insulating plate and then coating an inner surface of the through-hole penetrating through the plastic insulating plate with a metal or press-fitting a metal plug into the through-hole.

In one example of the present invention, a method of forming the through-hole is not particularly limited as long as it is commonly used in the art, and the through-hole may be formed, for example, using a drilling or laser direct ablation (LDA) manner.

In one example of the present invention, the metal coating of the inner surface of the through-hole is not particularly limited, but may be performed through a method such as electroless plating, electroplating, or sputtering, and the press-fitting of the metal plug may be performed through a method of filling a conductive material in the through-hole, or inserting a metal plug manufactured in a shape of the through-hole into the through-hole, such a method is not limited as long as it is a method that may fill the inner surface of the through-hole or the entire through-hole so that an electrical connection is possible.

Here, the metal coating or the metal plug may be formed of the same or different metal as the metal layer, for example a metal element material, and more specifically, may contain any one or two or more selected from the group consisting of gold (Au), silver (Ag), copper (Cu), chromium (Cr), aluminum (Al), tungsten (W), zinc (Zn), nickel (Ni), iron (Fe), and an alloy thereof. Preferably, in terms of cost savings while ensuring excellent electrical conductivity, the metal coating or the metal plug may contain copper (Cu) or a copper alloy.

As a specific aspect, before forming the through-hole for forming the via, in a case of the respective aspects including a case in which the metal dots and the bottom metal layer need to be electrically connected to each other through the metal dot vias, and the like, it is preferable that positions and patterns of the metal dots, the metal layers, and the vias are designed in advance.

Next, the selectively etching of the metal thin film on the opposite surfaces of the plastic insulating plate is described.

In one example of the present invention, the method of forming the metal dot, the metal layer, and the like may be used without being particularly limited as long as it is a method used in the PCB process, and as an example, the metal dot, the metal layer, and the like may be formed by masking the metal thin film of the regions designed as the metal dot, the metal layer, and the like through photolithography and then etching the metal thin film of the regions which are not masked.

Here, as described above, it is preferable that the positions and the patterns of the bottom metal layer and the metal dots are designed in advance so that the electrical connection is possible. For example, the sample plate according to the present invention may have various aspects of connection structures such as a metal dot-via-bottom metal layer connection structure; a metal dot-via-bottom metal layer-side metal layer-top metal layer connection structure; a metal dot-top metal layer-side metal layer-bottom metal layer connection structure; a metal dot-top metal layer-metal layer via-bottom metal layer connection structure; and the like, and the positions and the patterns of the metal layers and the metal dots may be appropriately designed according to such various aspects of connection structures, thereby manufacturing the sample plate.

In one example of the present invention, the photolithography may be performed through a typical method and is not particularly limited, but it is possible to mask the regions designed as the metal dots and the metal layers by attaching a dry film on the metal thin film, and exposing and developing the dry film attached on the metal thin film.

In one example of the present invention, an etching method is not particularly limited, but dry etching, wet etching, or a mixture thereof may be used. As a specific example, the dry etching may be plasma etching, and the wet etching may be etching using an etching solution.

In addition, it is to be understood that after forming the metal dots and the metal layers, a process of removing a resist used in masking a specific region may be further performed.

The mass of the sample to be analyzed may be analyzed according to a conventional MALDI mass spectrometry method using the sample plate for MALDI mass spectrometry manufactured as described above. Specifically, the mass of the sample to be analyzed may be analyzed by loading the sample to be analyzed on the metal dots of the sample plate for MALDI mass spectrometry and irradiating the sample to be analyzed with a laser to detach and ionize the sample.

Although the aspects of the present invention have been described hereinabove, the present invention may use various modifications, alterations and equivalents, and it is obvious that the present invention may use various changes, modifications, and equivalents, and suitably modify and equally apply the aspects. Therefore, the described contents do not limit the scope of the present invention as defined by the claims.

DESCRIPTION OF REFERENCE NUMERALS

100: plastic insulating plate, 200: metal dot,
210: sample seating surface part, 220: hydrophobic surface part,
300: bottom metal layer, 400(410): metal dot via,
420: metal layer via, 500(510): top metal layer,
520: side metal layer, 600: sample reservoir substrate,
700: gas passage, 800: magnet, 900: hydrophobic surface part

The invention claimed is:

1. A sample plate for matrix assisted laser desorption ionization (MALDI) mass spectrometry comprising:
a plastic insulating plate; and
metal dots formed on one surface of the plastic insulating plate and allowing a sample to be loaded on surfaces thereof,
wherein at the time of mass spectrometry, the metal dots are electrically connected to a sample plate voltage application part of a MALDI mass spectrometer.

2. The sample plate for MALDI mass spectrometry of claim 1, further comprising one or two or more metal layers formed to be in contact with a side surface, a bottom surface, a top surface, or these surfaces of the plastic insulating plate,
wherein the metal layers are electrically connected to the metal dots, and
at the time of mass spectrometry, the metal dots are electrically connected to the sample plate voltage application part of the MALDI mass spectrometer through the metal layers.

3. A sample plate for matrix assisted laser desorption ionization (MALDI) mass spectrometry comprising:
a plastic insulating plate;
metal dots formed on one surface of the plastic insulating plate and allowing a sample to be loaded on surfaces thereof;
a bottom metal layer formed on the other surface of the plastic insulating plate; and
metal dot vias formed to penetrate through the plastic insulating plate and being in contact with and electrically connected to the metal dots and the bottom metal layer.

4. The sample plate for MALDI mass spectrometry of claim 3, further comprising a top metal layer formed on one surface of the plastic insulating plate on which the metal dots are formed.

5. The sample plate for MALDI mass spectrometry of claim 4, wherein the top metal layer is in contact with and electrically connected to the metal dots, or is spaced apart from and not electrically connected to the metal dots,
when the metal layer is electrically connected to the metal dots, one surface of the plastic insulating plate on which the metal dots are formed includes an insulating part formed between the metal dots and the top metal layer which are spaced apart from each other; and a connection part adjacent to the insulating part and formed by the metal dots and the top metal layer which are in contact with each other, or an entire periphery of the metal dots and the top metal layer are in contact with each other, and when the metal layer is not electrically connected to the metal dots, one surface of the plastic insulating plate on which the metal dots are formed includes an insulating part allowing the entire periphery of the metal dots and the top metal layer to be spaced apart from each other, adjacent to the entire periphery of the metal dots, and surrounding the entire periphery of the metal dots.

6. The sample plate for MALDI mass spectrometry of claim 5, further comprising metal layer vias formed to penetrate through the plastic insulating plate, and being in contact with and electrically connected to the top metal layer and the bottom metal layer, wherein one surface of the plastic insulating plate on which the metal dots are formed includes the insulating part allowing the entire periphery of the metal dots and the top metal layer to be spaced apart from each other, adjacent to the entire periphery of the metal dots, and surrounding the entire periphery of the metal dots.

7. A sample plate for matrix assisted laser desorption ionization (MALDI) mass spectrometry comprising:
a plastic insulating plate;
metal dots formed on one surface of the plastic insulating plate;
a top metal layer formed on one surface of the plastic insulating plate on which the metal dots are formed and electrically connected to the metal dots;
a bottom metal layer formed on the other surface of the plastic insulating plate; and
metal layer vias formed to penetrate through the plastic insulating plate and being in contact with and electrically connected to the top metal layer and the bottom metal layer.

8. The sample plate for MALDI mass spectrometry of claim 7, wherein one surface of the plastic insulating plate on which the metal dots are formed includes:
an insulating part formed between the metal dots and the top metal layer which are spaced apart from each other; and
a connection part adjacent to the insulating part and formed by the metal dots and the top metal layer which are in contact with each other, or
an entire periphery of the metal dots and the top metal layer are in contact with each other.

9. A sample plate for matrix assisted laser desorption ionization (MALDI) mass spectrometry comprising:
a plastic insulating plate;
metal dots formed on one surface of the plastic insulating plate;
a top metal layer formed on one surface of the plastic insulating plate on which the metal dots are formed and electrically connected to the metal dots; and
a side metal layer formed on a side surface of the plastic insulating plate and being in contact with and electrically connected to the top metal layer.

10. The sample plate for MALDI mass spectrometry of claim 9, wherein one surface of the plastic insulating plate on which the metal dots are formed includes:

an insulating part formed between the metal dots and the top metal layer which are spaced apart from each other; and
a connection part adjacent to the insulating part and formed by the metal dots and the top metal layer which are in contact with each other, or
an entire periphery of the metal dots and the top metal layer are in contact with each other.

11. The sample plate for MALDI mass spectrometry of claim 9, further comprising a bottom metal layer formed on the other surface of the plastic insulating plate and being in contact with and electrically connected to the top metal layer.

12. The sample plate for MALDI mass spectrometry of claim 11, wherein one surface of the plastic insulating plate on which the metal dots are formed includes:
an insulating part allowing an entire periphery of the metal dots and the top metal layer to be spaced apart from each other, adjacent to the entire periphery of the metal dots, and surrounding the entire periphery of the metal dots; and
metal dot vias formed to penetrate through the plastic insulating plate and being in contact with and electrically connected to the metal dots and the bottom metal layer.

13. The sample plate for MALDI mass spectrometry of claim 1, wherein a diameter of the metal dot is 100 μm to 5 mm.

14. The sample plate for MALDI mass spectrometry of claim 2, wherein the metal dots and the metal layers independently contain any one or two or more selected from the group consisting of gold (Au), silver (Ag), copper (Cu), chromium (Cr), aluminum (Al), tungsten (W), zinc (Zn), nickel (Ni), iron (Fe), and an alloy thereof.

15. The sample plate for MALDI mass spectrometry of claim 1, wherein the plastic insulating plate has a hydrophobic surface property, and
the metal dots have a hydrophilic surface property.

16. The sample plate for MALDI mass spectrometry of claim 1, wherein a surface of the metal dot includes
a sample seating surface part positioned at a surface central portion of the metal dot; and
a hydrophobic surface part surrounding a periphery of the sample seating part, and the hydrophobic surface part has a hydrophobic property larger than that of the sample seating surface part.

17. The sample plate for MALDI mass spectrometry of claim 1, further comprising a sample reservoir substrate attached to one surface of the plastic insulating plate, surrounding the periphery of the metal dots, and including through-holes.

18. The sample plate for MALDI mass spectrometry of claim 7, wherein the sample reservoir substrate includes a gas passage through which an inert gas is discharged to through-holes.

19. The sample plate for MALDI mass spectrometry of claim 18, wherein the sample reservoir substrate is detachably attached to one surface of the plastic insulating plate.

20. A manufacturing method for a sample plate for matrix assisted laser desorption ionization (MALDI) mass spectrometry, the manufacturing method comprising:
forming a metal thin film on opposite surfaces of a plastic insulating plate;
forming vias penetrating through the plastic insulating plate; and
selectively etching the metal thin film on the opposite surfaces of the plastic insulating plate to form metal dots on one surface of the plastic insulating plate and form a bottom metal layer on the other surface of the plastic insulating plate, wherein the metal dots and the bottom metal layer are electrically connected to each other through the vias.

21. A manufacturing method for a sample plate for matrix assisted laser desorption ionization (MALDI) mass spectrometry, the manufacturing method comprising:

forming a metal thin film on opposite surfaces of a plastic insulating plate;

selectively etching the metal thin film on the opposite surfaces of the plastic insulating plate to form metal dots and a top metal layer on one surface of the plastic insulating plate and form a bottom metal layer on the other surface of the plastic insulating plate; and forming a side metal layer by forming a metal thin film which is in contact with a side surface of the plastic insulating plate, wherein the metal dots and the top metal layer are electrically connected to each other, the top metal layer and the side metal layer are electrically connected to each other, and the side metal layer and the bottom metal layer are electrically connected to each other.

22. A manufacturing method for a sample plate for matrix assisted laser desorption ionization (MALDI) mass spectrometry, the manufacturing method comprising:

forming a metal thin film on opposite surfaces of a plastic insulating plate;

selectively etching the metal thin film on the opposite surfaces of the plastic insulating plate to form metal dots and a top metal layer on one surface of the plastic insulating plate and form a bottom metal layer on the other surface of the plastic insulating plate;

forming metal dot vias or metal layer vias penetrating through the plastic insulating plate; and forming a side metal layer by forming a metal thin film which is in contact with a side surface of the plastic insulating plate, wherein the metal dots and the top metal layer are electrically connected to each other, the top metal layer and the side metal layer are electrically connected to each other, and the side metal layer and the bottom metal layer are electrically connected to each other, and the metal dots and the bottom metal layer are electrically connected to each other through the vias.

23. A matrix assisted laser desorption ionization (MALDI) mass spectrometry method, wherein a mass of a sample to be analyzed is analyzed by loading the sample to be analyzed on the metal dots of the sample plate for MALDI mass spectrometry of claim 1 and irradiating the sample to be analyzed with a laser to detach and ionize the sample.

\* \* \* \* \*

UNITED STATES PATENT AND TRADEMARK OFFICE
CERTIFICATE OF CORRECTION

PATENT NO. : 11,087,965 B2  
APPLICATION NO. : 16/483908  
DATED : August 10, 2021  
INVENTOR(S) : Taeman Kim et al.

Page 1 of 1

It is certified that error appears in the above-identified patent and that said Letters Patent is hereby corrected as shown below:

In the Claims

Column 22, Line 53, Claim 18, delete "claim 7," and insert -- claim 17, --

Signed and Sealed this  
Twenty-second Day of February, 2022

Drew Hirshfeld  
*Performing the Functions and Duties of the*  
*Under Secretary of Commerce for Intellectual Property and*  
*Director of the United States Patent and Trademark Office*